(12) United States Patent
Kelly

(10) Patent No.: US 11,231,952 B2
(45) Date of Patent: Jan. 25, 2022

(54) SYSTEMS AND METHODS FOR END USER EXPERIENCE BASED MIGRATION OF USER WORKLOADS ACROSS A COMPUTER CLUSTER

(71) Applicant: Dell Products, LP, Round Rock, TX (US)

(72) Inventor: John Kelly, Mallow (IE)

(73) Assignee: Dell Products, LP, Round Rock, TX (US)

( * ) Notice: Subject to any disclaimer, the term of this patent is extended or adjusted under 35 U.S.C. 154(b) by 43 days.

(21) Appl. No.: 16/440,669

(22) Filed: Jun. 13, 2019

(65) Prior Publication Data

US 2020/0394063 A1  Dec. 17, 2020

(51) Int. Cl.
*G06F 9/455* (2018.01)
*G06F 9/50* (2006.01)

(52) U.S. Cl.
CPC ........ *G06F 9/45558* (2013.01); *G06F 9/5088* (2013.01); *G06F 2009/4557* (2013.01); *G06F 2009/45583* (2013.01); *G06F 2009/45595* (2013.01)

(58) Field of Classification Search
CPC .................................................. G06F 9/45558
See application file for complete search history.

(56) References Cited

U.S. PATENT DOCUMENTS

| 2013/0152194 A1* | 6/2013 | Barak ................ G06F 21/6218 726/21 |
| 2014/0229527 A1* | 8/2014 | Bidarkar ................... G06F 9/54 709/203 |
| 2015/0347183 A1* | 12/2015 | Borthakur ............. G06F 9/4856 718/105 |

* cited by examiner

*Primary Examiner* — Charlie Sun
(74) *Attorney, Agent, or Firm* — Prol Intellectual Property Law, PLLC; H. Kenneth Prol (57) ABSTRACT

A method of migrating user workloads across a computer cluster, may include detecting a parameter associated with an end-user experience (EUE) during the emulation of a virtual machine (VM) operated within a virtual desktop infrastructure (VDI) environment; creating a composite score descriptive of the EUE; and migrating a workload associated with the VM among the computer cluster when a threshold composite score is reached.

20 Claims, 5 Drawing Sheets

SYSTEMS AND METHODS FOR END USER EXPERIENCE BASED MIGRATION OF USER WORKLOADS ACROSS A COMPUTER CLUSTER

FIELD OF THE DISCLOSURE

The present disclosure generally relates to load-balancing among a computer cluster comprising a plurality of information handling systems. The present disclosure more specifically relates to migration of virtual machines (VMs) between cluster nodes.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include a keyboard for manual input of information by the user.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Embodiments of the present disclosure provide for methods and systems for migrating user workloads across a computer cluster. The system and methods take into consideration the end-user experiences when determining whether to migrate a workload or a portion of a workload from one node within the computer cluster to another node. Specifically, the system may implement an issue or complaint recording system that gleans information for the complaints related to the execution of any given virtual desktop instance and creates, at least partially, a score based on those complaints. In some embodiments, a composite score may be created based on the end-user experience (EUE) and resources available at a node so as to determine whether the workload or a portion of the workload should be migrated.

In an embodiment, the method of creating the composite score may be iteratively improved using a computer learning method. The computer learning method may optimize the EUE assessment techniques described herein so as to improve the EUE based load balancing system. In a specific embodiment, the system and methods may implement a Pearson Correlation Coefficient that correlates any issues reported by a user with those resources available with the execution of the virtual desktop instance. This allows the system and method to determine those input parameters that contribute the most to the EUE based on the users' complaints provided to a help desk. The data associated with those complaints may be correlated to the resource usage so as to determine whether and how to adjust the scoring system used to create a composite score used to determine whether or not to migrate a workload or a portion of a workload.

In previous systems control migration of workloads across nodes with a computer cluster by considering only hardware resource utilization. Indeed, these previous systems do not aggregate these parameters in any way that attempts to comprehend EUE. Further, these previous systems do not consider any parameters that are "closer" to the user and are, arguably, more relevant to the EUE. These parameters not considered by the previous systems include logon time, application launch time, and latency issues associated with the virtual desktop instance.

Figure 1:
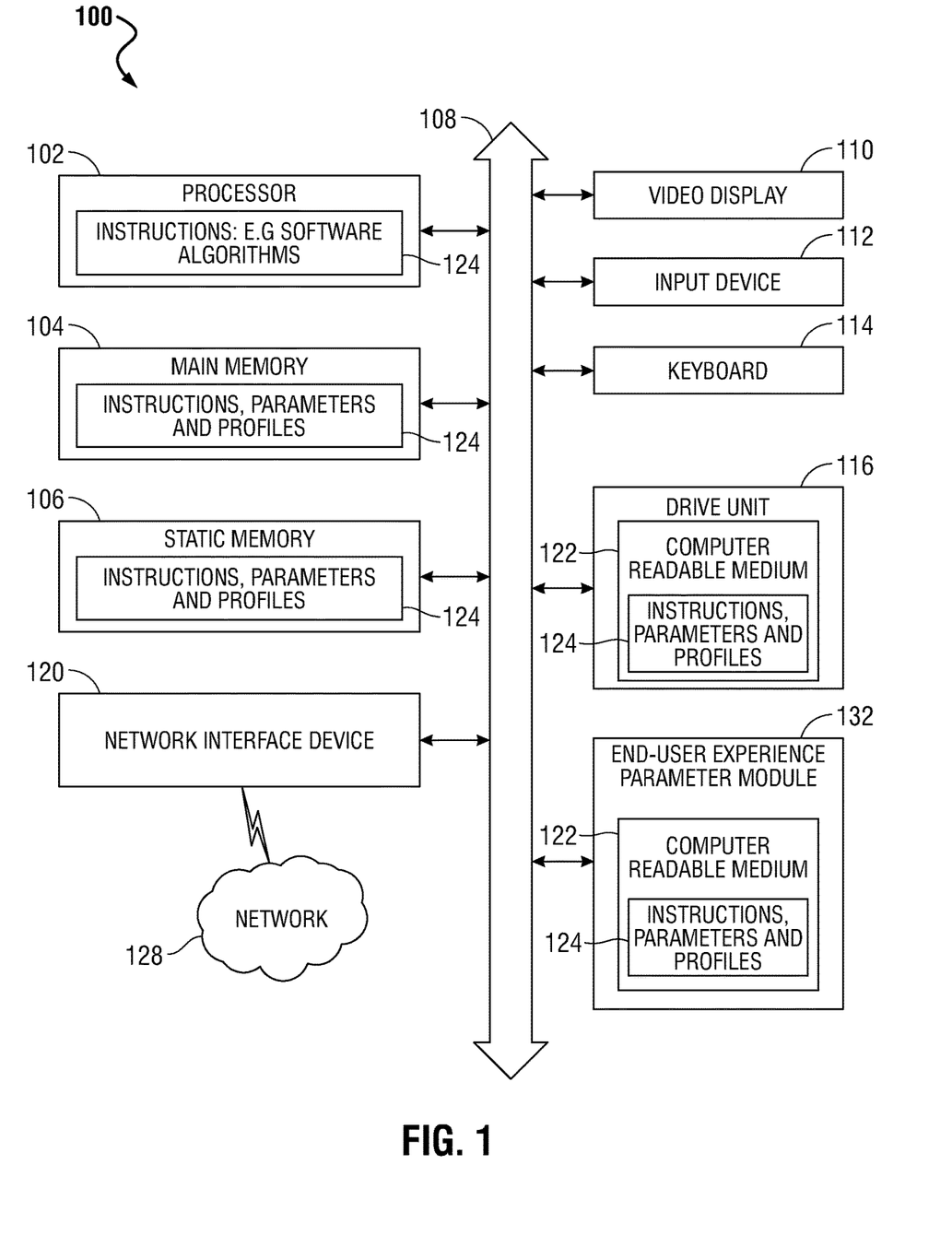
FIG. 1 is a block diagram illustrating an information handling system according to an embodiment of the present disclosure.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100, in the embodiment shown in FIG. 1, may operate in the capacity of a server or as a client computer in a server-client network environment, or as a peer computer system in a peer-to-peer (or distributed) network environment. In a particular embodiment, the computer system 100 can be implemented using electronic devices that provide voice, video or data communication. For example, an information handling system 100 may be any mobile or other information handling systems capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 122 storing instructions 124 of the EUE parameter module 132, and drive unit 116 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices.

As shown, the information handling system 100 may further include a video display 110. The video display 110 in an embodiment may function as a liquid crystal display (LCD), an organic light emitting diode (OLED), a flat panel display, a solid-state display, or a cathode ray tube (CRT). Additionally, the information handling system 100 may include an input device 112, such as a cursor control device (e.g., mouse, touchpad, or gesture or touch screen input, and a keyboard 114. The information handling system 100 can also include a disk drive unit 116.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. The wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, one wireless adapter 120 may operate two or more wireless links. The wireless network may have a wireless mesh architecture in accordance with mesh networks described by the wireless data communications standards or similar standards in some embodiments but not necessarily in all embodiments.

Wireless adapter 120 may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WLAN standards and WWAN carriers, which may operate in both license and unlicensed spectrums. For example, both WLAN and WWAN may use the Unlicensed National Information Infrastructure (U-NII) band which operate in the ~5 MHz frequency band such as 802.11 a/h/j/n/ac (e.g., center frequencies between 5.170-5.785 GHz). It is understood that any number of available channels may be available under the 5 GHz shared communication frequency band. WLAN, for example, may also operate at a 2.4 GHz band. WWAN may operate in a number of bands, some of which are proprietary but may include a wireless communication frequency band at approximately 2.5 GHz band for example. In additional examples, WWAN carrier licensed bands may operate at frequency bands of approximately 700 MHz, 800 MHz, 1900 MHz, or 1700/2100 MHz for example as well. In the example embodiment, mobile information handling system 100 includes both unlicensed wireless radio frequency communication capabilities as well as licensed wireless radio frequency communication capabilities. For example, licensed wireless radio frequency communication capabilities may be available via a subscriber carrier wireless service.

In some embodiments, software, firmware, dedicated hardware implementations such as application specific integrated circuits, programmable logic arrays and other hardware devices can be constructed to implement one or more of some systems and methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal, so that a device connected to a network 128 can communicate voice, video or data over the network 128. Further, the instructions 124 may be transmitted or received over the network 128 via the network interface device or wireless adapter 120.

The information handling system 100 can include a set of instructions 124 that can be executed to cause the computer system to perform any one or more of the methods or computer-based functions disclosed herein. For example, instructions 124 may execute an EUE parameter module 132, software agents, or other aspects or components. Various software modules comprising application instructions 124 may be coordinated by an operating system (OS), and/or via an application programming interface (API). An example operating system may include Windows®, Android®, and other OS types. Example APIs may include Win 32, Core Java API, or Android APIs.

The disk drive unit 116 and the EUE parameter module 132 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124. The disk drive unit 116 and static memory 106 also contain space for data storage. Further, the instructions 124 may embody one or more of the methods or logic as described herein. For example, instructions relating to the EUE parameter module 132 software algorithms may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the EUE parameter module 132 may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The EUE parameter module 132 may be stored in static memory 106, or the drive unit 116 on a computer-readable medium 122 such as a flash memory or magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include an EUE parameter module 132 that may be operably connected to the bus 108. The EUE parameter module 132 computer-readable medium 122 may also contain space for data storage. The EUE parameter module 132 may perform tasks related to detecting a parameter associated with an EUE during the emulation of a virtual machine (VM) operated within a virtual desktop infrastructure (VDI) environment; creating a composite score descriptive of the EUE; and migrating a workload associated with the VM among the computer cluster when a threshold composite score is reached, among other tasks.

In an embodiment, the EUE parameter module 132 may communicate with the main memory 104, the processor 102, the video display 110, the alpha-numeric input device 112, and the network interface device 120 via bus 108, and several forms of communication may be used, including ACPI, SMBus, a 24 MHZ BFSK-coded transmission channel, or shared memory. Keyboard driver software, firmware, controllers and the like may communicate with applications on the information handling system.

Figure 2:
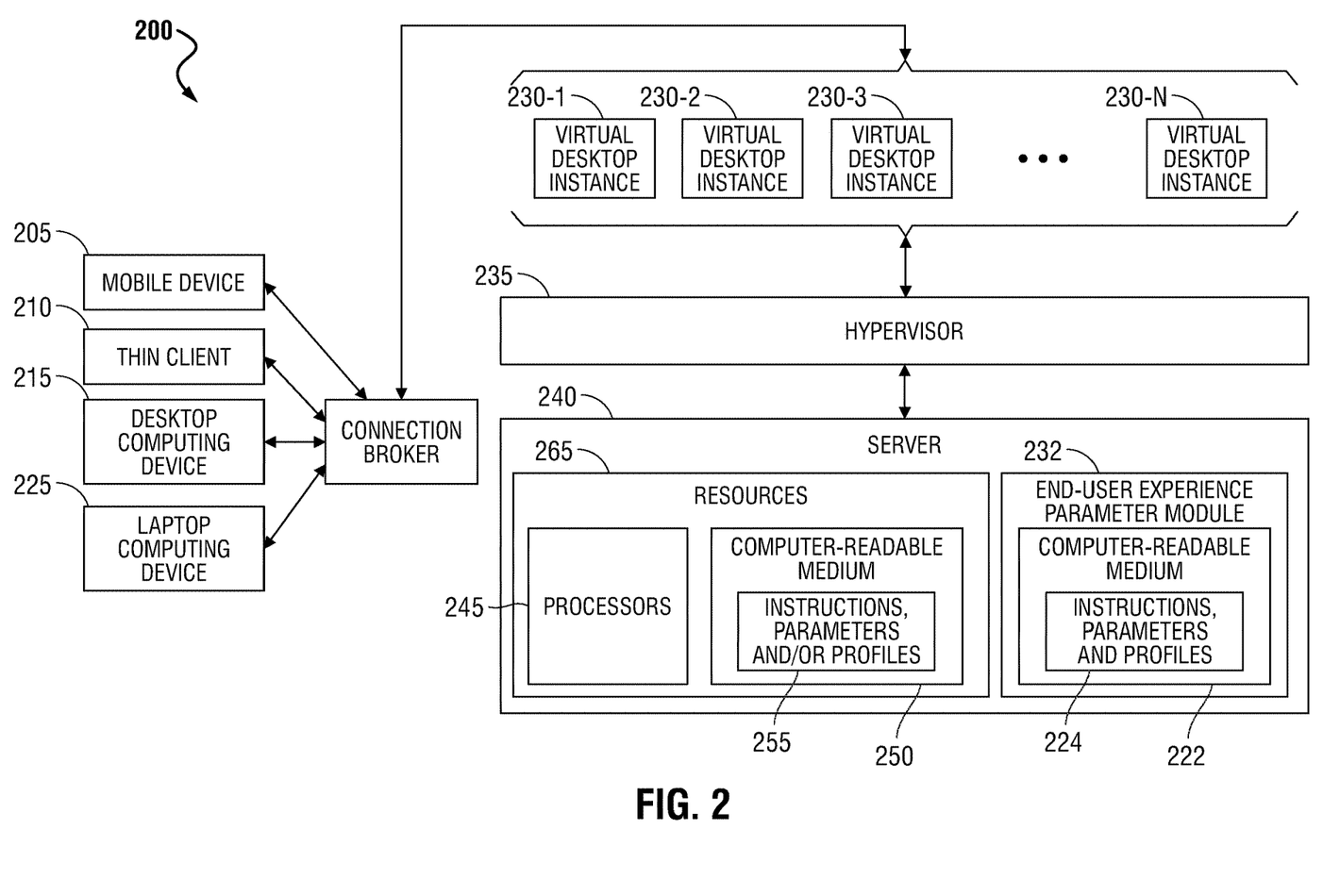
FIG. 2 is a block diagram illustrating a virtual desktop infrastructure (VDI) environment according to an embodiment of the present disclosure.

FIG. 2 is a block diagram illustrating a virtual desktop infrastructure (VDI) environment 200 according to an embodiment of the present disclosure. A VDI environment 200 may be any computing environment that separates the desktop environment and associated application software from the physical client device that is used to access it. In embodiments presented herein, the VDI environment 200 allows any number or type of information handling systems to access a virtual desktop instance 230-1, 230-2, 230-3, 230-N so as to operate the virtual desktop using a number of resources on a server 240. The virtual desktop instances 230-1, 230-2, 230-3, 230-N described herein may, in an embodiment, be referred to as a virtual machine (VM) that is presented to a user of an information handling systems 205, 210, 215, 225 by the server 240 as an emulation of a computer system that provides a functionality of a physical information handling system. In an example, the virtual desktop instances 230-1, 230-2, 230-3, 230-N may be any separation of a desktop environment and any associated computer-readable medium from a physical information handling system 205, 210, 215, 225 used to access that desktop environment.

The information handling systems 205, 210, 215, 225 that access the virtual desktop instances 230-1, 230-2, 230-3, 230-N may be any type of device or devices that operable to compute, classify, process, transmit, receive, retrieve, originate, switch, store, display, manifest, detect, record, reproduce, handle, or use any form of information, intelligence, or data for business, scientific, control, entertainment, or other purposes. Examples of information handling systems 205, 210, 215, 225 may include a laptop computing device 225, a tablet device, a smartphone device, a desktop computing device 215, or a thin client 210, among others. In the example where the information handling system 205, 210, 215, 225 is a thin client 210, the thin client 210 may by any information handling system that is optimized for establishing a remote connection with, in this example, the server 240 as described herein. Specifically, the thin client may be any device that relies on the processing power and/or storage capacity of the server 240 in order to launch computer-readable program code, perform calculations, and/or store data associated with input provided by a user of the thin client. In embodiments presented herein, the information handling systems 205, 210, 215, 225 may be described in connection with operation of the systems and methods described herein without limitation from other possible information handling systems.

In an embodiment, the server 240 may operate as one of a number of cluster nodes. In this example, the server 240 may represent a current node within a cluster of nodes that provides resources to the information handling systems 205, 210, 215, 225 as described herein. In embodiments presented herein, the server 240 and specifically the end-user experience (EUE) module 232 may implement a method of migrating user workloads associated with the operation of the virtual desktop instances 230-1, 230-2, 230-3, 230-N across the cluster nodes (i.e., a cluster of information handling systems) similar to that of the server 240. This may be done by, for example, detecting a parameter associated with an EUE during the emulation of a virtual desktop instance 230-1, 230-2, 230-3, 230-N (i.e., virtual machine) operated within a virtual desktop infrastructure (VDI) environment; creating a composite score descriptive of the EUE; and migrating a workload associated with the virtual desktop instance 230-1, 230-2, 230-3, 230-N among the computer cluster when a threshold composite score is reached. In an example, the threshold score may be 20 out of 100.

During implementation of the method and system described herein, the resources used by any of the information handling systems 205, 210, 215, 225 may be spread across multiple servers 240 or computing nodes or centralized in a single server 240 or cluster node depending on the composite score descriptive of the EUE as described herein. As such, many servers 240 may form a cluster of nodes all or one of which providing resources to any single information handling system 205, 210, 215, 225 via execution of the virtual desktop instances 230-1, 230-2, 230-3, 230-N.

In an embodiment, the VDI environment 200 and, specifically, the server 240, may run hosted applications for the information handling systems 205, 210, 215, 225 or for other networked systems such as the information handling system of FIG. 1. This may, in an embodiment, occur by establishing a virtual machine application executing software to manage applications hosted at the server 240. The information handling system 100 of FIG. 1 may be adapted to run one or more applications locally, and to have hosted applications run in association with the local applications at the server 240 via creation of a virtual desktop instance 230-1, 230-2, 230-3, 230-N. This exemplary virtual machine application may serve one or more applications to each of the information handling systems 205, 210, 215, 225 upon input from a user of the information handling systems 205, 210, 215, 225. Thus, as illustrated in FIG. 2, information handling systems 205, 210, 215, 225 may be running applications locally while requesting data objects related to those applications from the server 240, such as via a connection broker 260 after execution of the, herein mentioned, virtual machine application.

In an embodiment, the virtual machine application may run locally at each of the individual information handling systems 205, 210, 215, 225. During operation, in an embodiment, a user of any of the information handling systems 205, 210, 215, 225 may cause the virtual machine application to be executed. In this embodiment, a request may be sent to the connection broker 260 requesting that a virtual desktop instance 230-1, 230-2, 230-3, 230-N be created on behalf of that information handling system 205, 210, 215, 225. An enabling layer such as the hypervisor 235 may help to create and run the individual virtual desktop instances 230-1, 230-2, 230-3, 230-N at, for example, the server 240. The hypervisor 235 may present the any guest operating systems on the information handling systems 205, 210, 215, 225 information handling systems 205, 210, 215, 225 with a virtual desktop instance 230-1, 230-2, 230-3, 230-N and manage the execution of those guest operating systems. Multiple instances of a variety of operating systems may share the virtualized hardware resources presented by the hypervisor 235 and server 240: for example, Linux®, Windows®, and macOS® instances can all run on a single physical Intel® core personal computer.

In an embodiment, the connection broker 260 may be any device or executable computer-readable program code that connects the information handling systems 205, 210, 215, 225 to the virtual desktop instances 230-1, 230-2, 230-3, 230-N provided by the server 240. The connection broker 260 may also be responsible for the authentication of the users of the information handling systems 205, 210, 215, 225 and direct those users to their respective virtual desktop instances 230-1, 230-2, 230-3, 230-N. The connection broker 260 may also keep track of active and inactive virtual desktop instance 230-1, 230-2, 230-3, 230-N. When a user sends a request to connect to the server 240, it may provide the user with an idle virtual desktop instance 230-1, 230-2, 230-3, 230-N. When a user disconnects any given information handling system 205, 210, 215, 225, the connection broker 260 may update the status to an "inactive" state.

The server 240 within the VDI environment 200 may include a number of resources 265. These resources, among additional types of resources 265, may include a number of processors 245 and computer readable media 250. Similar to that described in connection with FIG. 1, the processors 245 may be a CPU, microprocessor, control logic or some combination of the same that receives computer-readable program code and data to provide output to a user or other device within the VDI environment 200. Any of the processing resources may operate to execute code that is either firmware or software code.

The computer readable media 250 may include any instructions, parameters, and/or profiles 255. The instructions, parameters, and/or profiles 255 may be maintained on the computer readable media 250 or a series of computer readable media 250 associated with the VDI environment 200 and/or server 240. Again, the computer readable media 250 may include the instructions, parameters, and/or profiles 255 that, when executed by the processors 245, performs the methods and processes described herein. Specifically, execution of the instructions, parameters, and/or profiles 255 by the processors 245 of the server 240 may detect a parameter associated with an EUE during the emulation of a virtual desktop instance 230-1, 230-2, 230-3, 230-N (i.e., virtual machine) operated within the VDI environment 200; create a composite score descriptive of the EUE; and migrate a workload associated with the virtual desktop instance 230-1, 230-2, 230-3, 230-N among the computer cluster when a threshold composite score is reached, among other processes described herein.

In an embodiment, the migration of the virtual desktop instances 230-1, 230-2, 230-3, 230-N from cluster node to cluster node within the VDI environment 200 may depend on a number of migration factors associated with the EUE. An example feature may include a logon time associated with the time it takes to initiate and provide credentials to create a virtual desktop instance 230-1, 230-2, 230-3, 230-N on the server 240. Another example migration factor may include the duration of time the server 240 takes to launch an application by the processors 245. Yet another example migration factor may include any latency experienced between any of the information handling systems 205, 210, 215, 225 and the server 240 as a result of, in an example, resource use at the server 240. Any additional migration factors may be considered as well in order to determine whether a virtual desktop instance 230-1, 230-2, 230-3, 230-N is migrated to another server 240 or other cluster node. In the embodiments presented herein, the migration factors may be related to any experience experienced by the end user at the information handling system 205, 210, 215, 225 and may vary depending on the metrics of operation of the server 240 in relation to the user's experiences during the operation of the virtual desktop instance 230-1, 230-2, 230-3, 230-N. In an embodiment, any of these migration factors may be associated with a weighting factor that places more or less weight on any of these exemplary migration factors used to create the composite score. The weighting factors may be assigned based on resources available within the computer cluster, number of information handling system 205, 210, 215, 225 communicatively coupled to the server 240, the number of virtual desktop instances 230-1, 230-2, 230-3, 230-N created by the server 240 for the information handling systems 205, 210, 215, 225, among other weighting factors. In an embodiment the weights assigned to any of the weighting factors may vary over time and vary based on current or changed weighting factors involved in the operation of the VDI environment 200.

In an example, the methods described herein may include an optimization of process of creating the composite score descriptive of the EUE. This optimization process may be used to systematically vary the composite score descriptive of the EUE using an integrated feedback loop and/or machine learning system and method. This feedback loop and/or machine learning system and method may monitor data input into, for example, a virtual helpdesk ticketing system related to poor end-user experience data experienced by the user on the VDI environment 200. This monitored data may or may not be a result of any virtual desktop instance 230-1, 230-2, 230-3, 230-N being migrated from one cluster node (i.e., the server 240) to another but instead may originate from any source that can accept the EUE data. When either user-input data or VDI environment 200-created data is received it may be saved on the computer readable media 250 for use by the feedback loop and/or machine learning system and method. Specifically, the feedback loop and/or machine learning system may pull all available node resource utilization data as well as user environment data (including all available data points not being used for assessment of the EUE) and implement, for example, a Pearson Correlation Coefficient-based approach to determine any input parameters that are actually effecting the EUE. The information presented by the use of the Pearson Correlation Coefficient-based approach may be used to change the process for calculating the composite score descriptive the EUE. This may result in an improved EUE-based load balancing system that balances any resource use load among the clustered information handling systems such as the server 240. Through this process, the user experience with the VDI environment 200 may be improved resulting in better user satisfaction as well as increased productivity.

In an embodiment, the migration of the workload associated with the virtual desktop instances 230-1, 230-2, 230-3, 230-N may be conducted when a threshold composite score is reached. As described herein, this threshold level may be set by, for example, the number of migration factors used to create the composite score, the weighting factors used, and the weight applied to all migration factors, among other considerations. In an embodiment, the threshold level may be set by an administrator of the server 240 and/or VDI environment 200 generally. As described herein, the composite score associated with the server 240 may be maintained on the computer-readable medium 250 and accessed and executed by the processors 245 in order to achieve the methods, processes, and functionalities associated with the VDI environment 200 described herein. Specifically, the processor 245 may access the threshold level composite score when conducting the methods and processes described herein.

Figure 3:
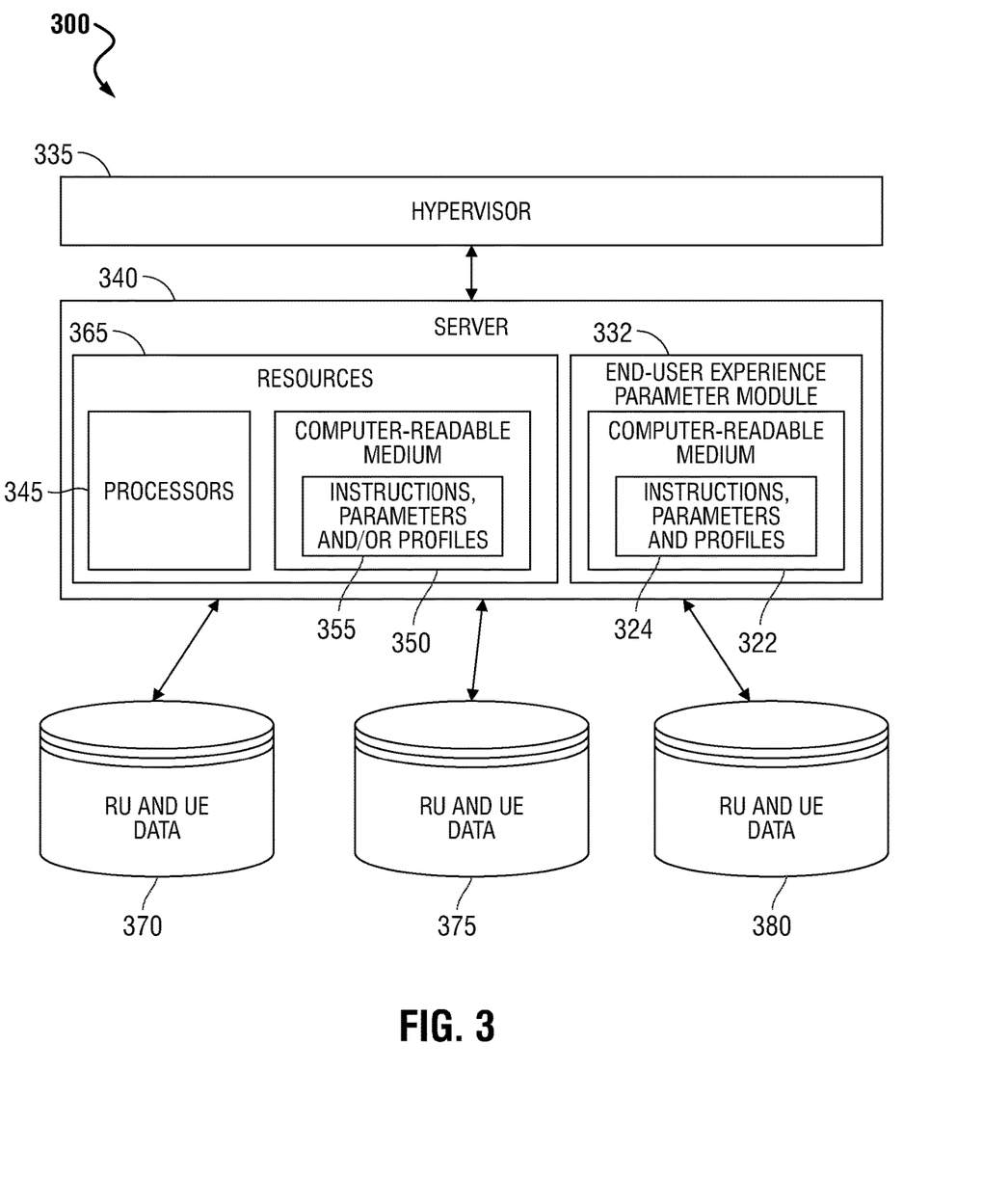
FIG. 3 is a block diagram illustrating a server within a VDI environment according to an embodiment of the present disclosure.

FIG. 3 is a block diagram illustrating a server 340 within a VDI environment 300 according to an embodiment of the present disclosure. The server 340 may communicatively interface with any information handling system within the VDI environment 300 using a hypervisor 335. The hypervisor 335 (also called a virtual machine monitor) may be any computer-readable program code, firmware, hardware, or combinations thereof that helps to create the virtual machines being executed on the server 340 and implementing the resources present on that server 340. The hypervisor 335 may provide to any information handling system with a virtual operating platform and manage the execution of operations on those virtual operating platforms.

During operation, the server 340 may provide any type of resource such as processing resources via the processors 345 and data storage resources via the computer-readable medium 350. The server 340 may also provide for the execution (on the created virtual machines) of word processing applications, spreadsheet applications, accounting applications, web browsing applications, email applications, media player applications, file viewer applications, gaming applications, and photo editor applications, among other types of computer applications defined by computer-readable program code. All or portions of this computer-readable program code may be maintained on the computer-readable medium 350 as part of the instructions, parameters, and/or profiles 355.

As described herein, the server 340 includes a EUE parameter module 332. The EUE parameter module 332 may implement a method of migrating user workloads associated with the operation of the virtual desktop instances across a plurality of information handling systems communicatively coupled to the server 340 that, together, form the computer cluster. This may be done by, for example, detecting a parameter associated with an EUE during the emulation of a virtual desktop instance (i.e., virtual machine) operated within a VDI environment; creating a composite score descriptive of the EUE; and migrating a workload associated with the virtual desktop instance among the computer cluster when a threshold composite score is reached.

In order to create the composite score so as to determine whether to migrate the virtual desktop instances or not, the server 340 may refer to resource utilization (RU) data and user environment (UE) data 370 maintained on storage device either local to the server 340 or communicatively coupled to the server 340. The RU data may define to what extent the resources such as the processors 345 and computer-readable medium 350 are being used by any given virtual desktop instance and/or the plurality of virtual desktop instances operating on and executed by the server 340. Because this RU data is in a constant state of change due to the number of virtual desktop instances executed and the applications and/or operations being executed on those virtual desktop instances behalf by the server 340, the RU data among the RU and UE data 370 may be updated at any interval of time or in real-time. The UE data may be any data associated with the environment the user or the virtual desktop instances are experiencing on the desktop environment emulated by the virtual desktop instances. Again, this data may be updated at any interval or in real-time based on the changing state of the environment experienced by any given user on the desktop emulated at the virtual desktop instance.

As described herein, the server 340 may use the RU and UE data 370 to help create a composite score determinative of whether or not to migrate any virtual desktop instance executed on the server 340. Again, the RU and UE data 370 may have individual, multiple, or group weighting factors to the RU, the UE, or both so as to allow flexibility at the server 340 as to how and when to migrate the virtual desktop instances executed on the server 340. Again, these weighting factors may be set and maintained on the computer-readable medium 350 of the servers 340 for use by the processors 345 during execution of the methods described herein and specifically during the creation of the composite score as described herein.

Alternatively, or additionally, in order to create the composite score so as to determine whether to migrate the virtual desktop instances or not, the server 340 may refer to a EUE user issue data 375. This data may comprise any system-identified or user-specified data descriptive of an end user's experience in interacting with the server 340 and the virtual desktop instance executed thereon. This EUE user issue data 375, in an embodiment, may be received from a ticketing system that received input from a user descriptive of that user's experience. In this embodiment, the ticketing system may receive phone data, email data, instant messaging data, or other types of communicative data that originate from the user and directed to the ticketing system communicatively associated with the server 340. The issue data may be descriptive of any given user's experience with, for example, logon time associated with the time it takes to initiate and provide credentials to create a virtual desktop instance on the server 340, the duration of time the server 340 takes to launch an application by the processors 345, network latency, and generally user-defined issues associated with interacting on a virtual desktop executing the virtual desktop instance.

In the embodiment where the EUE user issue data 375 originates from a recorded telephone conversation, the server 340 (via an application program interface (API)) or other system associated with server 340 may transcribe the conversation and pull detailed information regarding user identification information, identification information regarding the type of information handling system used by the user to access the virtual desktop instance, resource requirements of the information handling system, or any other information associated with issues experienced or currently being experienced by the user. Similar methods may be implemented when the communication received from the user is in text form. In these examples, all text may be saved at a EUE user issue data 375 storage device also communicatively coupled to the server 340.

As described herein, the server 340 may use the EUE user issue data 375 to help create a composite score determinative of whether or not to migrate any virtual desktop instance executed on the server 340. Again, the EUE user issue data 375 may have individual, multiple, or group weighting factors to allow flexibility at the server 340 as to how and when to migrate the virtual desktop instances executed on the server 340. These weighting factors may be set and maintained on the computer-readable medium 350 of the servers 340 for use by the processors 345 during execution of the methods described herein and specifically during the creation of the composite score as described herein.

After the composite score has been calculated, that composite score may be compared to a threshold score accessible to the processors 345 of the VDI environment 300. The score may be adjusted temporarily by an administrator of the VDI environment 300 or may be adjusted using a machine learning process that takes into consideration user-defined issues presented at a help-desk or other ticketing system.

In an embodiment, updated or changed data used in the creation of the composite score descriptive of the EUE may be maintained in an EUE scoring system table 380. In an embodiment, the EUE scoring system table 380 may maintain any number of historic scoring rulescoring rules created by the server 340 and/or the VDI environment 300 generally. In an embodiment, the processors 345 may access historical scoring rulescoring rules so as to implement the most recently defined scoring rulescoring rules when determining whether to migrate a workload from one cluster node to another. Thus, during operation, a correlation coefficient (i.e., a Pearson Correlation Coefficient) may be calculated that links any user-reported EUE issues with any of the RU and UE data 370. In the specific example of the Pearson Correlation Coefficient, the processors 345 may access the RU and UE data 370 and EUE user issue data 375 associated with all of the nodes (i.e., servers 340) within a cluster of nodes as described herein. With this information, the processors 345 of the server 340 or any other processing device may calculate the Pearson Correlation Coefficient that links the occurrences of any EUE user issue with each of the RU and UE data 370.

The Pearson Correlation Coefficient (PCC) is a value descriptive of a linear correlation between two variables that may be a covariance of the two variables divided by the product of their individual standard deviations. In the embodiments presented herein, the two variables used in determining the linear correlation may be 1) the EUE issue data 375 and the UE data 370; and/or 2) the EUE issue data 375 and the RU data 370. Thus, a linear correlation may be made with regards to an accumulation of specific types of EUE issue data received by the system or user and the environment the user is accessing the VM. Additionally, a linear correlation may be made with regards to an accumulation of specific types of EUE issue data received by the system and the resources utilized in order to present the user with the VM. In an example, the PCC value may be a value between +1 and −1 where 1 is a total positive linear correlation, 0 is no linear correlation, and −1 is a total negative linear correlation. Although, in an embodiment, the PCC may be used to linearly correlate the EUE with the UE and RU data 370, the present description contemplates other types of correlation methods that allow the systems described herein to determine the impact of the RU and EU data 370 on an EUE.

When the Pearson Correlation Coefficient is calculated, the processors 345 may then stack rank any RU and UE parameters that have been found to impact the EUE. Specifically, those RU and UE parameters that had most effected or most correlated with an EUE issue reported by a user per the EUE user issue data 375 may be ranked higher than other RU and UE parameters. With this ranking, it may be determined whether or not a change in the methodology of creating the composite score is conducted. In an embodiment, the composite score may be changed when it is discovered that the "most complained about" user-reported issue related to the EUE regards, for example, network latency. In this specific example, additional weight may be placed on the RU data associated with network latency such that migration of any workload of any virtual desktop instances may occur more readily if network latency is detected. This process may be executed iteratively thereby improving the method of creating a composite score descriptive of an EUE so as to improve the herein-described method of migrating user workloads across a computer cluster. This increases the ability of the system to pull all available data associated with any given node within the node cluster (i.e., every server 340) as well as EUE user issue data 375 in order to determine the input parameters that most contribute to a relatively better EUE. The system and method may also use this information from the RU and UE data 370 storage devices and the EUE user issue data 375 storage devices to change the process for calculating the composite score used to migrate workloads from one server 340 within the node cluster to another server 340 with alternative resources. This allows for a more balanced load among the different nodes thereby increasing the usability of the node cluster by any number of users resulting in greater user satisfaction.

In any embodiment presented herein, the composite score may be any value based on the performance parameters of the VDI environment 300. Among the performance parameters, in an embodiment, the VDI environment 300 may consider a logon time by a user of an information handling system to a VM, an application launch time at the VM, issues presented by a user of the VDI environment either verbally or textually, and latency issues associated with execution of computer readable program code at the VM, among other parameters. Each of these parameters may be assigned a value. In an embodiment, the value assigned to these parameters may be on a scale of 1-10 where 1 is poor performance and 10 is excellent performance. Once a value has been assigned to these parameters, other considerations may be made such as associating weighting factors with each value. These weighting factors may be user-defined by, for example, a network administrator. In an example, after the application of the weights or without application of the weights, the values associated with each parameter may be aggregated or added to each other to get a composite score. The composite score, therefore, may define the EUE as described herein. During operation, in an embodiment, the composite score may be compared to a threshold composite score to determine whether or not a threshold value is below or has exceeded a predetermine threshold value. The threshold value may be set by a network administrator in an embodiment. The determinization of what the threshold value is may be dependent on a number of factors including, but not limited to the type of applications executed by any VM, corporate goals of a corporation providing the VMs to users, monetary goals by the corporation providing the VMs to the users, network connections to user devices executing the VMs, among others. Thus, the threshold value may be any value that may further the interests to those network administrators and, therefore, may vary depending on the type of users, the type of network administrators, and expected physical device utilization by the users, among other considerations.

Figure 4:
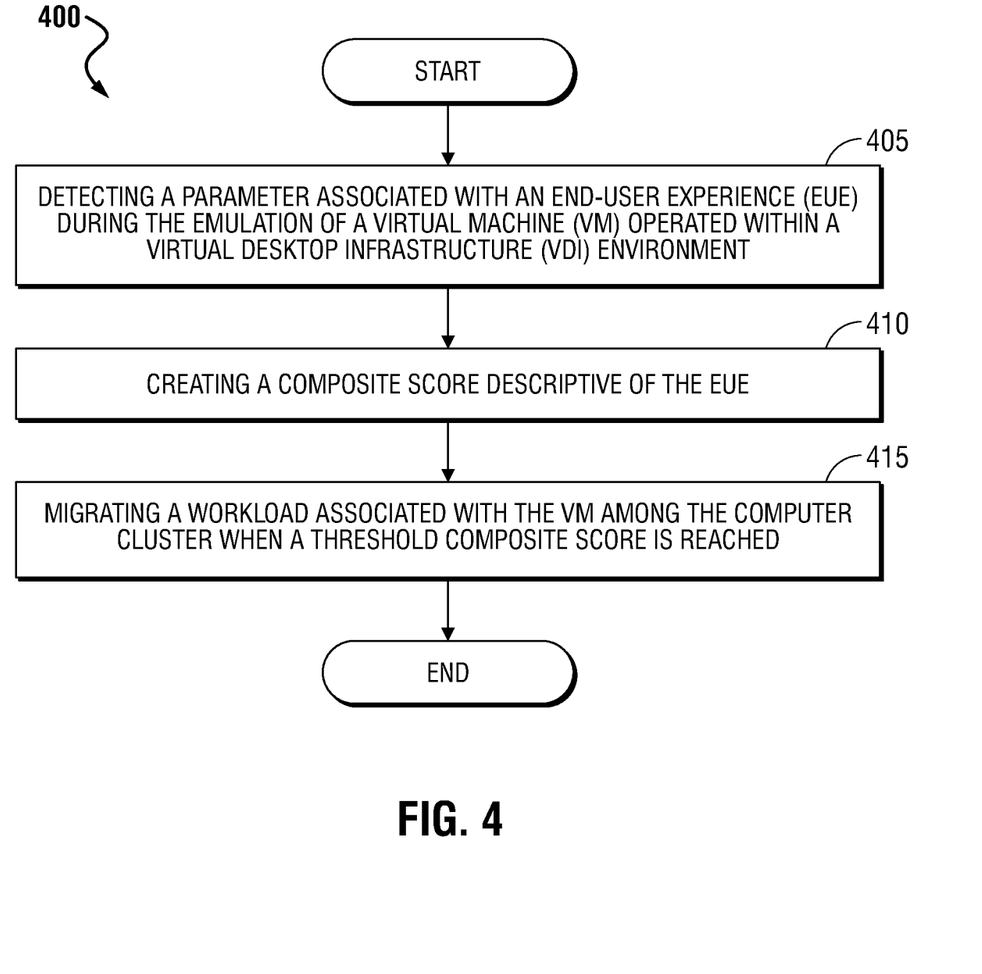
FIG. 4 is a flow diagram illustrating a method of migrating user workloads across a computer cluster according to an embodiment of the present disclosure.

FIG. 4 is a flow diagram illustrating a method 400 of migrating user workloads across a computer cluster according to an embodiment of the present disclosure. The migration of user workloads may include, in any embodiment described herein, the migration of any virtual desktop instance from one node within the node cluster to another node. In the context of the present description, this may include moving the access of a memory device, management of data at a storage device, management of network connectivity, and processing of executable computer-readable program code, among others from one server to another server among a cooperative group of servers. Consequently, although the present systems and methods describe the use of a specific server to initiate and maintain a virtual desktop via a number of virtual desktop instances, it is appreciated that, when applicable, these services provided by that server may be migrated to another server via implementation of the methods 400 described herein.

The method 400 may begin with detecting at block 405 a parameter associated with an EUE during emulation of a virtual machine (VM) operated within a virtual desktop infrastructure (VDI) environment. As described herein, the initiation of a virtual machine may be handled by a hypervisor associated with a server among a plurality of servers. In these examples, a user may communicatively couple an information handling system to the server by accessing certain API and providing, in some examples, login information indicating that the user is authorized to cause the initiation of the VM at the server. During access by the user to a virtual desktop instance represented as an emulated VM at the user's information handling system, the server may detect at block 405 any parameter that describes aspects of the capabilities of any resources of the server to complete any computer-related tasks executed at the VM. These parameters may include, for example, a logon time, an application launch time, or network latency. Specifically, a parameter may include the duration of time it took for the user's login information to be received and processed by the server in order to grant access to a virtual desktop instance at the server. Additionally, a parameter may include the duration of time it takes to execute an application (defined by computer-readable program code on the server) at the server on behalf of the VM. Still further, a parameter may include the duration of time it takes to send and receive data over any communication devices of a network associated with server 340. Because the server may be in a remote location to the user's information handling system, the amount of time it may take to transfer data to and from the user's information handling system and the server may be a parameter to be detected at block 405.

Still further, a parameter may include any user-provided data describing the user's experience with the VM. In an embodiment, a user may be allowed to send reports to a help desk that is capable of receiving a verbal communication from a user, an electrical communication from a user, or any other type of communication. In any case, these communications may be related to the user's experience and, in some examples, complaints or indications that issues associated with the use of the information handling system or the VDI environment described herein. In the example where the communication from the user to the help desk is a verbal communication, the systems associated with the computer cluster may implement a voice-to-text API that analyzes any verbal message or real-time voice from the user and coverts those sounds into text. The text may then be analyzed so as to determine which part of the EUE the user has issues with or is currently having a poor or unexpected experience with. Similarly, where the communications from the user to the help desk are in electronic form, the text may be analyzed so as to also determine which part of the EUE the user may have issues with or is currently having a poor or unexpected experience with.

The method 400 may continue with creating at block 410 a composite score descriptive of EUE. Specifically, the score may be based on any number of migration factors that change or have the ability to change an experience the user has when interacting with the information handling system or subsystems described herein. These migration factors may include the use of resources spread among the information handling systems within the computer cluster. As described herein, the workload associated with the user's virtual desktop instance may be one of many virtual desktop instances operated on any given server or information handling system among the computer cluster. Because some virtual desktop instances may use more resources of the server than the server may be capable of providing, the workload or certain processes of the workload may be handled by other servers or information handling systems within the computer cluster. The amount of resources required by the execution of any given virtual desktop instances as well as the resources available may help to create, at block 410, the composite score. Still further, the creation at block 410 of the composite score may be based on a logon time associated with the time it takes to initiate and provide credentials to create a virtual desktop instance on the server. Another example migration factor may include the duration of time the server takes to launch an application by the processors of that server. Yet another example migration factor may include any latency experienced between any of the information handling systems such as the user's information handling system and the server as a result of, in an example, resource use at the server. Any additional migration factors may also be considered when creating, at block 410, the composite score and the present specification contemplates the consideration of these other migration factors in order to creating the composite score at block 410. In any embodiment, any weight may be given to any of these migration factors and the individual scores of the migration factors may form a composite score using any mathematical operation (including aggregation) so as to creating the composite score at block 410. Thus, the example migration factors and weighting factors described herein are not meant to be limiting, but merely examples of potential migration factors used to create, at block 410, the composite score.

As described herein, a composite score may be any value based on the performance parameters of the VDI environment 300. Among the performance parameters, in an embodiment, the VDI environment 300 may consider a logon time by a user of an information handling system to a VM, an application launch time at the VM, issues presented by a user of the VDI environment either verbally or textually, and latency issues associated with execution of computer readable program code at the VM, among other parameters. Each of these parameters may be assigned a value. In an embodiment, the value assigned to these parameters may be on a scale of 1-10 where 1 is poor performance and 10 is excellent performance. Once a value has been assigned to these parameters, other considerations may be made such as associating weighting factors with each value. These weighting factors may be user-defined by, for example, a network administrator. In an example, after the application of the weights or without application of the weights, the values associated with each parameter may be aggregated or added to each other to get a composite score. The composite score, therefore, may define the EUE as described herein.

The method 400 may continue with migrating at block 415 a workload associated with the VM among the computer cluster when a threshold composite score is reached. As described herein, the migration 415 may be all or part of the workload associated with any given virtual desktop instance. In an example, the user may be executing a word processing application along with a spreadsheet application via the virtual desktop instance on the server. In this example, where the creation, at block 410, of the composite score so indicates, the workload associated with the word processing application, the workload associated with the spreadsheet application, or both may be migrated to another server so as to provide a better EUE.

During operation, in an embodiment, the composite score may be compared to a threshold composite score to determine whether or not a threshold value is below or has exceeded a predetermine threshold value. The threshold value may be set by a network administrator in an embodiment. The determinization of what the threshold value is may be dependent on a number of factors including, but not limited to, the type of applications executed by any VM, corporate goals of a corporation providing the VMs to users, monetary goals by the corporation providing the VMs to the users, network connections to user devices executing the VMs, among others. Thus, the threshold value may be any value that may further the interests to those network administrators and, therefore, may vary depending on the type of users, the type of network administrators, and expected physical device utilization by the users, among other considerations.

The migration at block 415 of any or all workload may take into consideration the available resources present at the server currently executing the virtual desktop instance as well as at any other potential server or node within the computer cluster that would receive all or a portion of the workload. These resources may include, but not limited to, processing power, disk input/output, and disk storage capacity, among others. As such the information handling system may include a processor that may access data related to available resources on any given node (i.e., mobile device 205; thin client 210; desktop computing device 215; and laptop computing device 225) within the computer cluster to determine how and to what extent any given workload should be migrated at block 415. With the ability to migrate all or a portion of workload associated with any given virtual desktop instance, the computer cluster may provide an optimal EUE to not only a specific user, but to a plurality of users each executing a virtual desktop instance. Indeed, this further allows for the information handling system and VDI environment described herein to indicate to an administrator if, how, and when to increase the resources available on the computer cluster so as to better serve the end user and provide an optimal EUE to a plurality of end users. At this point, the method 400 may end.

In am embodiment, the method 400 may be executed based on the execution of computer-readable program code. In an embodiment, the computer-readable program code may be in any form including, but not limited to, C++, C, JavaScript, BASIC, and Python. Example pseudo code may be as follows:

```
IF (BALANCING-INTERVAL-PASSED==TRUE) #
{ #
FOREACH (NODE IN CLUSTER-NODE-LIST) #
    { #
        EUE-SCORE[NODE] = AVERAGE(EUE-SCORE of NODE
        WORKLOADS) #Calculate EUE score for the node #
    } #
FOREACH (NODE IN CLUSTER-NODE-LIST) #
{ #
FOREACH VM IN NODE #
{ #
IF (VM-EUE-SCORE< MINIMUM EUE-THRESHOLD) #
    { #
    MIGRATE VM TO NODE WITH HIGHEST EUE-SCORE #
    } #
} #
}
}#
```

Figure 5:
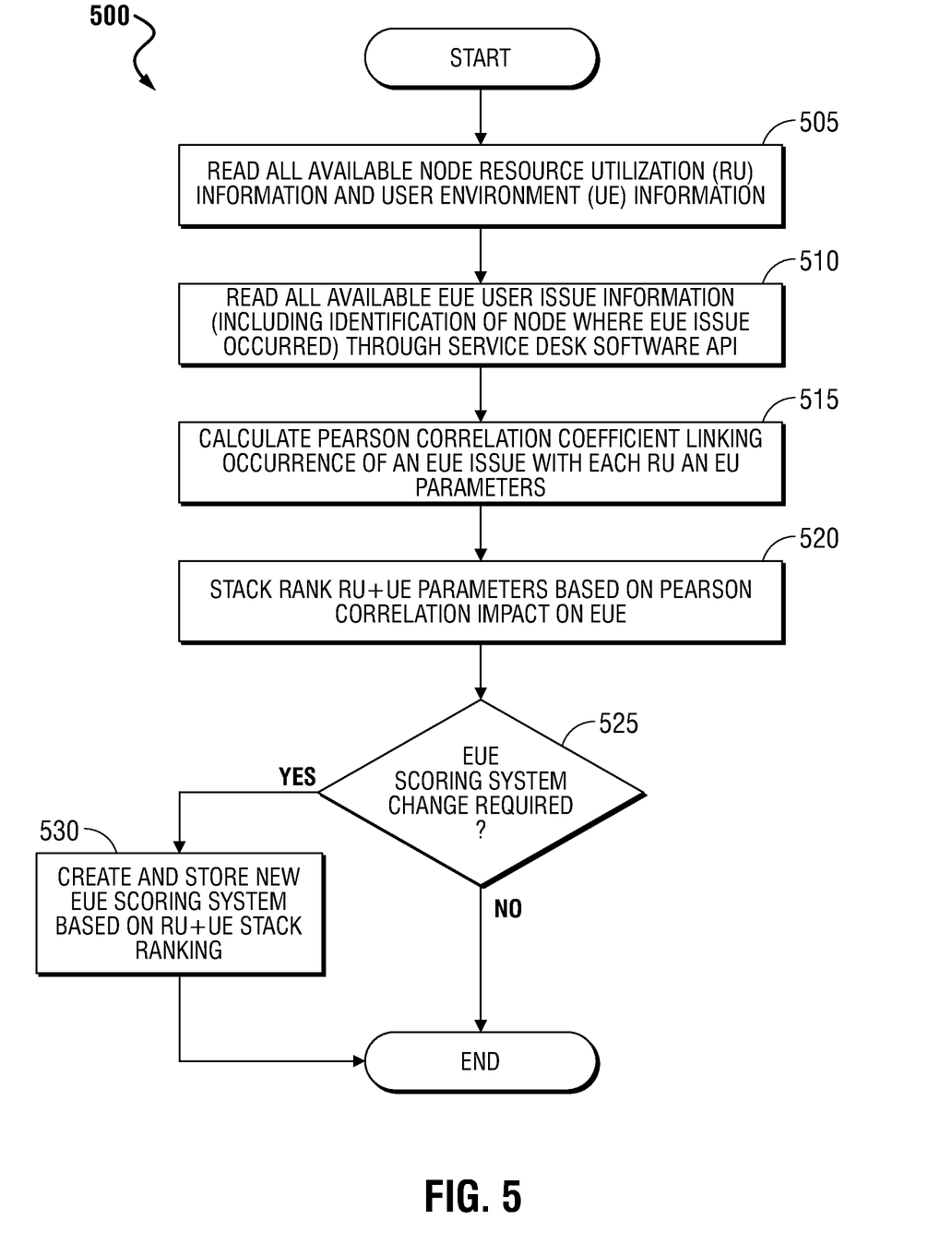
FIG. 5 is a flow diagram illustrating a method of updating a composite score used to migrate a workload associated with a virtual machine running on a computer cluster according to an embodiment of the present disclosure.

FIG. 5 is a flow diagram illustrating a method 500 of updating a composite score used to migrate a workload associated with a virtual machine running on a computer cluster according to an embodiment of the present disclosure. The method 500 may begin with reading at block 505 all available node resource utilization (RU) data or information as well as all user environment (UE) data or information. As described herein, the server or any other node within a computer cluster may refer to RU data and user UE data maintained on storage device either local to the server or communicatively coupled to the server. The RU data may define to what extent the resources such as the processors and computer-readable medium are being used by any given virtual desktop instance and/or the plurality of virtual desktop instances operating on and executed by the server. Because this RU data is in a constant state of change due to the number of virtual desktop instances executed and the applications and/or operations being executed on those virtual desktop instances behalf by the server, the RU data among the RU and UE data may be updated at any interval of time or in real-time. The UE data may be any data associated with the environment the user or the virtual desktop instances are experiencing on the desktop environment emulated by the virtual desktop instances. An example of a UE may include any graphical user interface (GUI) presented to the user, hardware implemented to present the GUI to the user, and other technical details relative to the human/machine interaction that allow a user to interact with any information handling system. Again, this data may be updated at any interval or in real-time based on the changing state of the environment experienced by any given user on the desktop emulated at the virtual desktop instance.

The method 500 may continue with reading at block 510 all EUE user issue data or information via a service desk software API. As described herein, a user may provide, to the information handling system, any feedback describing issues or complaints as to the experiences the user is having during the user's interaction with the information handling system executing the virtual desktop instance on the user's behalf. This user issue data may be received by a "help desk" associated with the information handling system and may be in textual or auditory form. Thus, a user may interact with the help desk by either calling a certain phone number that records the user's complaints or issues or sending some text message or email describing the same. This data may be accessed by the information handling system and read at block 510 according to the method 500 described herein. For example, text or auditory data may be recognized by voice or text recognition processes to facilitate the classification of issue types in some embodiments. In other embodiments, a help desk administrator may classify feedback as describing certain types of issues.

The method 500 may continue with calculating at block 515 a Pearson Correlation Coefficient (PCC) that links an occurrence of an EUE issue received at the help desk with each of the RU and UE factors described herein. A PCC is a measure of the linear correlation between two variables such as the RU and UE and has a value between +1 and −1, where 1 is total positive linear correlation, 0 is no linear correlation, and −1 is total negative linear correlation. Although, the methods and systems described herein describe the use of a PCC in connection with updating a composite score used to migrate a workload associated with a virtual machine running on a computer cluster, the present specification contemplates a correlation between the EUE issues received by the help desk and the RU and UE occurs as described herein.

As the PCC is calculated at block 515, the method 500 may rank at block 520 (i.e., stack rank) the RU/UE parameters based on that calculated PCC. This ranking at block 520 may indicate to the information handling system those specific UE parameters most complained about by any or all specific users in relation to those resources used by their respective virtual desktop instances. Because one goal is to increase user satisfaction (i.e., EUE) in relation to the information handling system, those parameters that most effect certain aspects of the UE may be ranked higher than those that are not necessarily or mostly complained about by the users. Accordingly, in an embodiment, the issues that impact the EUE most may have a higher priority associated with them so that those issues may increase the EUE both quantitatively and qualitatively.

It is here that the method 500 may determine whether a change in the EUE scoring system is to be conducted. By way of example only, the present description indicated that certain weighting factors may be associated with the migration factors used to determine if and when to migrate any given workload or portion of work load across any nodes within the computer cluster. Because some of these migration factors relate to the issue or complaints received by any given user, those weighting factors may be adjusted to assure that any over-utilized resources associated with those complaints are given relatively more weight. This assures that that information handling system will determine those input parameters that actually contribute to the EUE and use this information to change the process for calculating of the composite score as described herein. As such, where, in this embodiment, a weighting factor is to be change at 525, the information handling system may do so by creating and storing 530 a new EUE scoring rule based on the newly developed RU/US rankings. Other parameters may also be taken into consideration when determining at 525 that YES that a new EUE scoring rule is to be created and stored 530. These may include a physical change in the available resources presented to any given virtual desktop instance as well as any other infrastructural change made to any resource of the information handling system generally. Where, based on the ranking of the RU/EU parameters, it is determined at 525 that NO changes are to be made to the scoring rule, the process may end. However, in an example, the method 500 described in connection with FIG. 5 may be repeated any number of times, at any time, and for any length of time so that the process 500 may be iterative. That is, the method 500 may integrate any feedback loop or learning system scenario that allows the optimization of the EUE experience assessment techniques during operation of the information handling system. Indeed, in an embodiment, the information handling system may monitor data input to the help desk in relation to poor EUE on the VDI environment reported by the users. Because the method 500 takes into consideration those issues presented by the users the scoring rule may change dynamically based on those user issues so that at any given time and/or over time the EUE is improved for all users. Consequently, the user satisfaction is increased as well as the productivity of any given user when executing applications via the virtual desktop instances.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

The blocks of the flow diagrams of FIGS. 4 and 5 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A method of migrating user workloads across a computer cluster, comprising:
   detecting a parameter associated with an end-user experience (EUE) during the emulation of a virtual machine (VM) operated within a virtual desktop infrastructure (VDI) environment, where the VDI environment is a computing environment that separates the computing environment and associated application software from the a thin client device used to access the computing environment;
   creating a composite score descriptive of the EUE, wherein creating the composite score comprises assigning a score to the parameters associated with the EUE and aggregating those scores; and
   migrating a workload associated with the VM among the computer cluster when a threshold composite score is reached.

2. The method of claim 1, wherein the parameter is a logon time, an application launch time, or network latency.

3. The method of claim 1, where the emulation of the virtual machine is initiated by the thin client device communicatively coupled to the VDI environment.

4. The method of claim 1, wherein the composite score for the EUE includes determining a correlation value linking a help desk EUE issue with a node resource utilization and user environment.

5. The method of claim 1, comprising updating a scoring rule associated with the creation of the composite score descriptive of the EUE by:
    accessing any node resource utilization (RU) and user environment (UE) information associated with the emulation of the VM;
    accessing any user-provided information associated with the EUE;
    calculating a Pearson Correlation Coefficient that correlates the user-provided information and the RU and UE information; and
    updating the scoring rule associated with creating a composite score and storing the updated scoring rule.

6. The method of claim 1, comprising updating a scoring rule associated with creating a composite score descriptive of the EUE and wherein the scoring rule is updated in series with the migration of the workload.

7. The method of claim 1, wherein migrating a workload associated with the VM among the computer cluster is based on resources within the VDI environment that, when the VM is migrated thereto, places the composite score below the threshold composite score.

8. A system for migrating a virtual machine within a computing cluster, comprising:
    a plurality of information handling systems communicatively coupled to cooperate in order to provide resources to a client device communicatively coupled to the plurality of information handling systems, where the plurality of information handling systems establish a computing environment that separates the computing environment and associated application software from the client device used to access the computing environment;
    an end-user experience (EUE) parameter module to detect a parameter associated with an end-user experience (EUE) during the emulation of a virtual machine (VM) by the client device accessing the computing environment of the plurality of information handling systems;
    a scoring module to create a composite score descriptive of the EUE, wherein creating the composite score comprises assigning a score to the parameters associated with the EUE and aggregating those scores; and
    a migration module to migrate a workload associated with the VM among the resources provided by the plurality of information handling systems when a threshold composite score is reached.

9. The system of claim 8, wherein the parameter is a logon time, an application launch time, or network latency.

10. The system of claim 8, wherein the composite score for the EUE includes determining a correlation value linking a help desk EUE issue with a node resource utilization and user environment.

11. The system of claim 8, comprising a scoring rule updating module to update a scoring rule associated with the creation of the composite score descriptive of the EUE by:
    accessing any node resource utilization (RU) and user environment (UE) information associated with the information handling systems of the computing cluster;
    accessing any user-provided information associated with the EUE;
    calculating a Pearson Correlation Coefficient that correlates the user-provided information and the RU and UE information; and
    updating the scoring rule associated with creating a composite score and storing the updated scoring rule.

12. The system of claim 8, comprising a scoring rule updating module to update a scoring rule associated with the creation of the composite score descriptive of the EUE by updating a scoring rule associated with creating a composite score descriptive of the EUE; wherein the scoring rule is updated in series with the migration of the workload.

13. The system of claim 8, wherein migrating a workload associated with the VM among the computer cluster is based on resources within the VDI environment that, when the VM is migrated thereto, places the composite score below the threshold composite score.

14. The system of claim 8, comprising a virtual desktop infrastructure (VDI) environment to receive input, from a user at a help desk, descriptive of issues associated with the use of the virtual machine.

15. A computer program product for migrating user workloads across a computer cluster, the computer program product comprising:
    a computer readable storage medium comprising computer usable program code embodied therewith, the computer usable program code to, when executed by a processor:
    detect a parameter associated with an end-user experience (EUE) during the emulation of a virtual machine (VM) operated within a virtual desktop infrastructure (VDI) environment, where the VDI environment is a computing environment that separates the computing environment and associated application software from a thin client device used to access the computing environment;
    create a composite score descriptive of the EUE, wherein creating the composite score comprises assigning a score to the parameters associated with the EUE and aggregating those scores; and
    migrate a workload associated with the VM among the computer cluster when a threshold composite score is reached.

16. The computer program product of claim 15, wherein the parameter is a logon time, an application launch time, or network latency and wherein the processor monitors the logon time, application launch time, or network latency associated with each EUE.

17. The computer program product of claim 15, where the emulation of the virtual machine is initiated by the thin client device communicatively coupled to the VDI environment.

18. The computer program product of claim 15, comprising computer usable program code to assign the score to the parameters associated with the EUE includes determining a correlation value linking a help desk EUE issue with a node resource utilization and user environment.

19. The computer program product of claim 15, comprising computer usable program code to update a scoring rule associated with the creation of the composite score descriptive of the EUE, the computer usable program code to, when executed by a processor:
    access any node resource utilization (RU) and user environment (UE) information associated with the emulation of the VM;
    access any user-provided information associated with the EUE;

calculate a Pearson Correlation Coefficient that correlates the user-provided information and the RU and UE information; and update the scoring rule associated with creating a composite score and storing the updated scoring rule.

20. The computer program product of claim 15, comprising computer usable program code to, when executed by a processor, update s scoring rule associated with creating a composite score descriptive of the EUE, wherein the scoring rule is updated in series with the migration of the workload.

* * * * *